Jan. 15, 1957  W. H. KUNTZ  2,777,963
SEALED WASHING MACHINE MOTOR
Filed Nov. 17, 1953
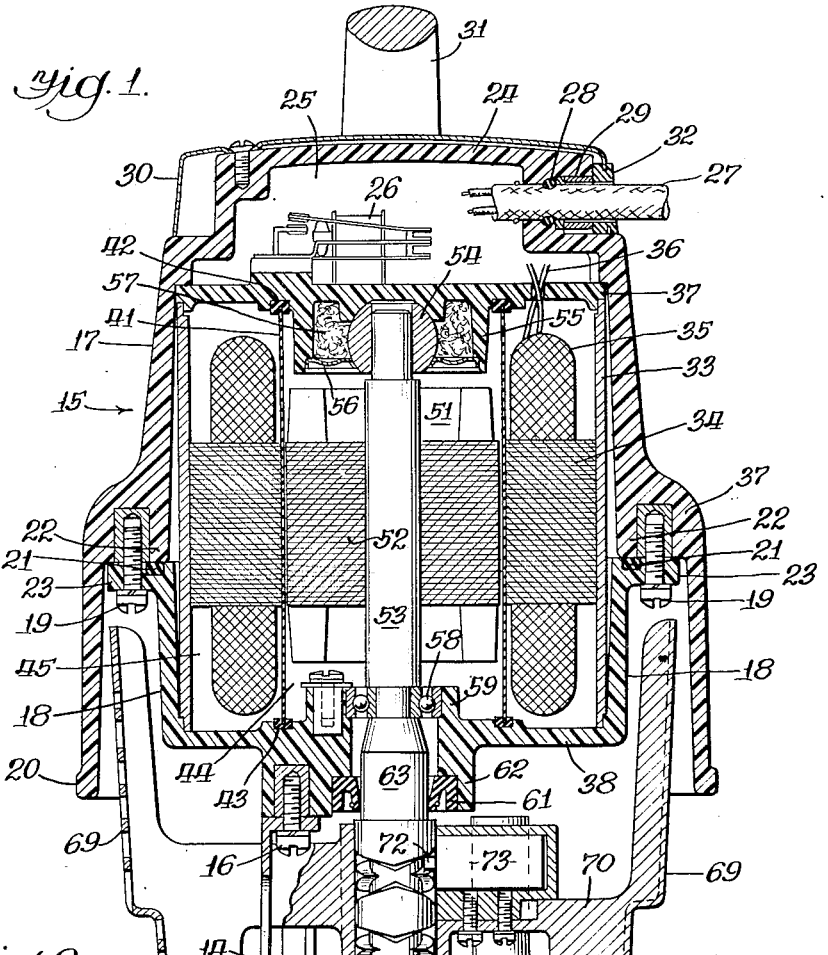
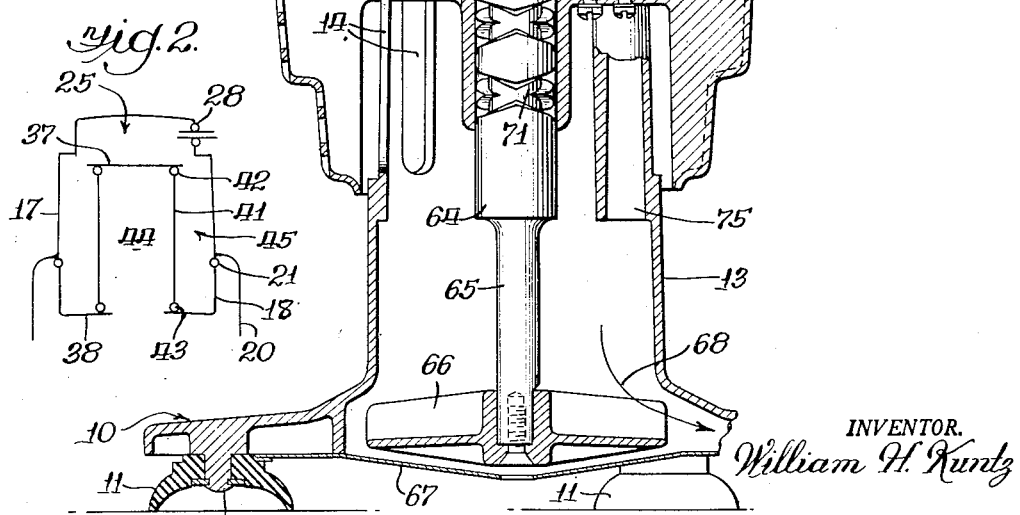
INVENTOR.
William H. Kuntz
By L. F. Hammond Atty.

United States Patent Office 2,777,963
Patented Jan. 15, 1957

2,777,963

SEALED WASHING MACHINE MOTOR

William H. Kuntz, Grand Rapids, Mich., assignor to Ami Incorporated, Grand Rapids, Mich., a corporation of Delaware Application November 17, 1953, Serial No. 392,561

2 Claims. (Cl. 310—86)

This invention relates to portable washing machines and to electric motors of a type particularly adapted to use in connection with such machines, or for other applications requiring a motor having its windings completely isolated from its moving parts so that it is entirely shockproof and shortproof, even under such adverse conditions as when immersed in water in a grounded receptacle.

The commercial development of small, portable, electric washing machines, wherein the washing mechanism and its motor are entirely separate from the tub and are adapted to be used in any convenient receptacle, has heretofore been retarded by the fact that fractional horsepower motors with their electrical leads and winding so well insulated that they may be safely used for such purposes have been unavailable. In fact, it has heretofore been regarded as impractical to produce motors which are safe when the persons using them and the motors themselves are both subject to immersion in soapy water, etc., since the hazard of shock with known types of motors has been considerable. It is the general aim of the present invention to depart from the common parctices of motor building, in order to meet the need for an electrical motor having sealing and insulating devices different from and superior to those heretofore developed, in order to render such motors entirely safe for the contemplated uses.

It is therefore the primary object of the present invention to provide a fractional horsepower motor of unique design and construction, wherein the field windings of the motor and the electrical connections leading to said windings are electrically isolated by seals of the static compression type, and do not depend upon conventional "rotary shaft seals" for satisfactory performance. In accomplishment of this primary object it is also an object of the invention to dispose such compression seals in a manner whereby the electrical windings of the motor and the line cord are entirely isolated from the armature and its shaft.

It is a more specific object of the invention to provide a motor wherein the armature is surrounded and isolated from the field windings by a very thin cylindrical insulating sleeve sealed in the end plates at each end of the motor housing.

A further object is to provide a motor having its field poles, windings, and accessories such as a starting relay or the like, surrounded by and enclosed completely within a sealed housing, whereby the parts electrically connected to the line cord are completely isolated from the armature and its shaft.

A still further object useful in accomplishment of the above resides in the provision of a sealed field winding chamber of annular or toroidal shape, formed by the exterior motor housing which may be of insulating material, yet surrounding an armature chamber which is imperforate throughout its sides and top, with the armature shaft projecting only at the bottom.

A preferred embodiment of the invention is illustrated in the drawings of this specification, wherein:

Figure 1 is a vertical sectional view of a portable washing machine utilizing a sealed driving motor constructed in accordance with the teachings of this invention, and Figure 2 is a diagrammatic illustration of the sealed chambers incorporated into said motor.

The washing machine shown in the drawings includes a base 10 adapted to be temporarily affixed to the bottom of any convenient washing receptacle by rubber suction cups 11 mounted on the legs 12. The base is integral with a central upright column 13 having water inlets 14 in its sides, with an electric motor generally designated as 15 secured to the top of the column by a plurality of screws 16. The motor includes an exterior case or housing preferably formed of insulating material and consisting of an upper half 17 and a lower half 18 secured to each other by screws 19. A watertight seal is effected by an O ring 21 clamped against the shoulder 22 on the upper half of the housing by the flange 23 on the lower half. The upper piece 17 is provided with a closed top 24 to define an internal chamber 25, in which a motor starting relay 26 may be housed.

The line cord 27 of the motor enters the chamber 25 through a watertight seal including an O ring 28 with suitable retaining bushings 29. If desired, a lifting handle 31 may be provided, and a resilient outer grommet 32 may be used to prevent chafing of the cord 27 where is passes through the wall of the housing. As shown, the top of the motor housing is provided with a metal cover plate 30.

The exterior insulating housing 17—18 surrounds and encloses a cylindrical metallic motor shell 33 within which the laminations 34 forming the field poles of the motor are carried. These field poles are also provided with field windings 35 adapted to be energized from an exterior source of power through the line cord 27. To this end, the inner end of the line cord 27 is connected to the contacts of the starting relay 26, and thence interconnected to the field windings 35 by conductors 36 which extend through an aperture in an insulating end plate 37, clamped between the upper housing half 17 and the top of the metallic shell 33. The lower end of the shell 33 bears against an insulating end plate 38 formed as an integral part of the lower half 18 of the exterior motor housing.

The field windings 35 of the motor are protected on the inside by a thin cylindrical tube 41, having its upper end seated in a resilient ring 42 lying in an appropriate groove within the top plate 37 and its lower end seated on a similar seal 43 carried on the lower end plate 38. The parts are so dimensioned that the tightening of the screws 19 simultaneously compresses the O ring 21 and the resilient sealing rings 42 and 43. This results in an armature chamber 44 completely sealed at the top, with a watertight field chamber 45 of annular or toroidal shape, in communication with the sealed relay chamber 25 and completely enclosing and sealing the field poles 34 and field windings 35 of the motor. The tube 41 may be only a few thousandths of an inch in thickness, and is preferably of rigid insulating material, so that its presence between the field poles and the armature does not cause eddy currents.

The armature 51 of the motor includes pole laminations 52 carried by a vertical shaft 53 having its upper end journaled in a self-aligning bearing 54 in the hub 55 of the upper end plate 37. As shown, the bearing 54 is secured by a sheet metal retainer 56, and is provided with lubricated packing material 57 to assure adequate lubrication of the bearing for the life of the motor. The lower end of the armature shaft is carried in a conventional ball bearing 58 mounted on an inner hub 59 on the lower end plate 38. It is to be noted, however, that this type of motor, being of an induction type, requires no commutator or slip rings, and the armature thus has no direct electrical connections either with the field winding or the line cord.

The lower end of the armature chamber 44 is closed by a conventional rotary shaft seal 61 mounted on a downwardly extending hub 62 on the underside of the end plate 38 and surrounding the upper end of a vertical camshaft 63 projecting downwardly from the motor driveshaft 53.

The camshaft 63 includes an enlarged central portion 64, with an integral lower impeller shaft 65. The shaft 65 carries a centrifugal pump impeller 66 at its lower end whereby liquid from within the column 13 is projected radially from between the base 10 of the machine and the bottom plate 67, as indicated by the arrow 68. The cam 64 imparts reciprocating movement to an exterior washing member or "basket" 69, carried on the arms of a supporting spider 70. To this end, the cam 64 has a self-reversing helical cam groove 71 engaged by a dog portion 72 of a cam follower 73 on the spider, so that as the armature shaft and cam 64 rotate, the washing basket 69 is caused to move up and down. The action of the member 69 upon garments held in solution in a container into which the machine is placed is facilitated by the circulation of water and air under the influence of the impeller 66, which draws air through an air inlet tube 75 and mixes it with water entering the column 13 through inlets 14.

From the above it will be seen (Figure 2) that the armature chamber 44 of the motor is of inverted cup shape, entirely closed at the top. The upper housing half 17 is of similar shape, with a depending skirt 20 extending below the level of the field windings. Thus, when the machine is immersed in a container of wash water, the upright motor housing will function in a manner comparable to the functioning of a diving bell, wherein air entrapped within the armature chamber will prevent entrance of any water. More important, however, is the fact that the entire field winding chamber 45 and relay chamber 25 are sealed by sealing devices of the static compression type. These comprise the rings 42 and 43 and the O rings 21 and 28, which effect a positive airtight and watertight seal, and serve to isolate the field windings and starting relay in the field chamber 45 and relay chamber 25, so that there is no path whatsoever for moisture to enter. Thus, the adequate sealing of the electrical portions of the motor is by no means dependent upon the perfect functioning of the rotary shaft seal 61, and this rotary seal is used only to prevent access of water to the armature bearings in the event that the machine should be overturned.

It follows that there is no shock hazard due to possible grounding of the device. The construction eliminates any possibility of grounding the conductors of the service line through the wash water in which the machine is used and, as a consequence, eliminates any liability of injury to the user.

Having thus described my invention, what I claim as new and desire to secure by United States Letters Patent is:

1. In a portable electric washing machine including a base adapted to be temporarily positioned in any convenient washing receptacle and a supporting column projecting upwardly from the base, the combination of an induction motor mounted in vertical position on said supporting column and comprising stationary field poles with electrical windings thereon; with a watertight insulating housing of annular configuration entirely surrounding said field poles and windings on the outside and inside thereof; said housing consisting of an internal cylindrical sleeve immediately inside the field poles, insulating end plates engaging each end of the sleeve, and an outer insulating shell interconnecting said end plates and including a continuous annular skirt extending below the lowermost portion of said field windings; said housing having static compression seals comprising resilient rubber rings clamped between the cylinder, end plates and outer shell; with aligned bearings and a rotatable armature within said internal cylindrical sleeve, and a driveshaft projecting downwardly therefrom.

2. In a portable electric washing machine including a base adapted to be temporarily positioned in any convenient washing receptacle and a supporting column projecting upwardly from the base, the combination of an induction motor mounted in vertical position on said supporting column and comprising stationary field poles with electrical windings thereon; with watertight insulation entirely surrounding said windings on the outside and inside thereof; with insulating end plates engaging each end of said insulation, and an outer insulating shell interconnecting said end plates and including a continuous anular skirt extending below the lowermost portion of said field windings; said housing having static compression seals; with aligned bearings and a rotatable armature within said shell, and a drive shaft projecting downwardly therefrom.

References Cited in the file of this patent
UNITED STATES PATENTS

| | | |
|---|---|---|
| 2,128,544 | Surjaninoff | Aug. 30, 1938 |
| 2,184,446 | Snyder | Dec. 26, 1939 |
| 2,246,777 | Bordeaux | June 24, 1941 |
| 2,450,982 | O'Brien | Oct. 12, 1948 |
| 2,485,408 | Pezzillo | Oct. 18, 1949 |
| 2,517,233 | Peters | Aug. 1, 1950 |
| 2,603,161 | Lloyd | July 15, 1952 |
| 2,648,790 | Harmon | Aug. 11, 1953 |